(12) United States Patent
Goto et al.

(10) Patent No.: US 11,248,902 B2
(45) Date of Patent: Feb. 15, 2022

(54) OPTICAL DISTANCE MEASUREMENT DEVICE AND PROCESSING DEVICE

(71) Applicant: Mitsubishi Electric Corporation, Tokyo (JP)

(72) Inventors: Hiroki Goto, Tokyo (JP); Yoshihiro Matsumoto, Tokyo (JP); Kiyoshi Onohara, Tokyo (JP); Naoki Suzuki, Tokyo (JP); Takayuki Yanagisawa, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 0 days.

(21) Appl. No.: 17/089,071

(22) Filed: Nov. 4, 2020

(65) Prior Publication Data
US 2021/0048287 A1    Feb. 18, 2021

Related U.S. Application Data

(63) Continuation of application No. PCT/JP2018/023290, filed on Jun. 19, 2018.

(51) Int. Cl.
| | |
|---|---|
| *G01B 9/02* | (2006.01) |
| *G01B 11/02* | (2006.01) |
| *G01B 9/02017* | (2022.01) |
| *G01B 9/02002* | (2022.01) |
| *G01B 9/02004* | (2022.01) |

(52) U.S. Cl.
CPC ............ *G01B 11/026* (2013.01); *G01B 9/02* (2013.01); *G01B 9/02002* (2013.01); *G01B 9/02004* (2013.01); *G01B 9/02019* (2013.01)

(58) Field of Classification Search
CPC ............ G01B 11/026; G01B 9/02019; G01B 9/02002; G01B 9/02004; G01B 9/02; B24B 49/12; B23Q 17/24; G01C 3/06
See application file for complete search history.

(56) References Cited

U.S. PATENT DOCUMENTS

| 5,579,112 A | 11/1996 | Sugiyama et al. |
|---|---|---|
| 2009/0046276 A1* | 2/2009 | Moore ............... G01D 5/35316 356/73.1 |

(Continued)

FOREIGN PATENT DOCUMENTS

| JP | 7-265316 A | 10/1995 |
|---|---|---|
| JP | 2000-146524 A | 5/2000 |

(Continued)

OTHER PUBLICATIONS

International Search Report for PCT/JP2018/023290 dated Jul. 31, 2018, filed on Jun. 19, 2018.

(Continued)

*Primary Examiner* — Jonathan M Hansen
(74) *Attorney, Agent, or Firm* — Birch, Stewart, Kolasch & Birch, LLP

(57) ABSTRACT

An optical distance measurement device includes: a photodetector including PDs for receiving interference light output from an optical interference unit and outputting detection signals of the interference light; and a switch for selecting one of the detection signals output from the PDs, in which a distance calculation unit calculates a distance to a measurement object on the basis of the detection signal selected by the switch.

15 Claims, 6 Drawing Sheets

(56) References Cited

U.S. PATENT DOCUMENTS

| | | |
|---|---|---|
| 2009/0174578 A1 | 7/2009 | Taki |
| 2017/0242100 A1 | 8/2017 | Hinokuma et al. |
| 2020/0072978 A1* | 3/2020 | Boloorian ............. G01S 7/4917 |
| 2020/0072979 A1* | 3/2020 | Boloorian ............. G01S 7/4915 |

FOREIGN PATENT DOCUMENTS

| | | |
|---|---|---|
| JP | 2002-196227 A | 7/2002 |
| JP | 2008-27252 A | 2/2008 |
| JP | 2012-195473 A | 10/2012 |
| JP | 2015-68654 A | 4/2015 |
| JP | 2017-161484 A | 9/2017 |
| WO | WO 2014/203654 A1 | 12/2014 |
| WO | WO 2016/024332 A1 | 2/2016 |

OTHER PUBLICATIONS

Japanese Office Action in Japanese Patent Application No. 2018-549590 dated Nov. 13, 2018.

Examination report dated Dec. 6, 2021 issued in correspondinq Indian Patent Application No. 202047047195.

* cited by examiner

FIG. 1A
FIG. 1B
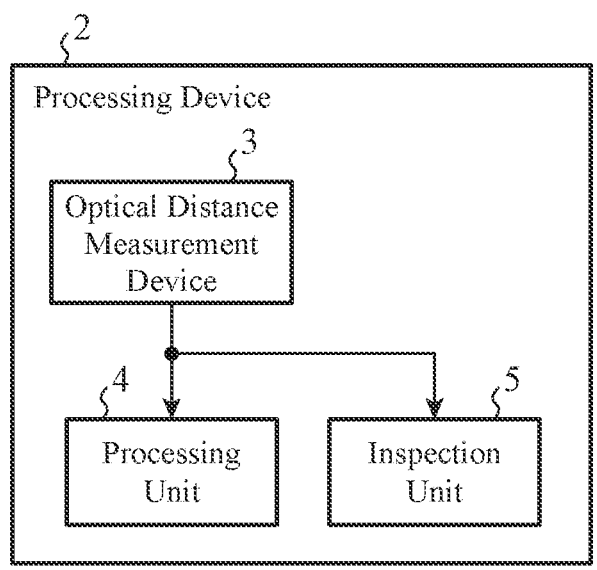
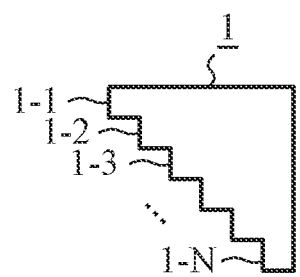

OPTICAL DISTANCE MEASUREMENT DEVICE AND PROCESSING DEVICE

CROSS REFERENCE TO RELATED APPLICATION

This application is a Continuation of PCT International Application No. PCT/JP2018/023290, filed on Jun. 19, 2018, which is hereby expressly incorporated by reference into the present application.

TECHNICAL FIELD

The present invention relates to an optical distance measurement device for calculating a distance to a measurement object, and a processing device including the optical distance measurement device.

BACKGROUND ART

As one of methods for measuring a distance to a measurement object using light, there is optical interferometry in which a light source frequency is swept.

In optical interferometry in which a light source frequency is swept, frequency sweep light the frequency of which changes with time is emitted toward a measurement object, and the frequency sweep light reflected on the measurement object is received as reflection light.

Patent Literature 1 discloses technology of using a portion of frequency sweep light before emission toward the measurement object as reference light, and measuring a distance to the measurement object on the basis of interference light between the reference light and reflection light.

CITATION LIST

Patent Literature

Patent Literature 1: JP H7-265316 A

SUMMARY OF INVENTION

Technical Problem

As optical distance measurement devices for calculating distances to multiple portions of a measurement object, there are optical distance measurement devices in which multiple light receiving elements that receive reflection light and output detection signals of the reflection light are mounted.

An optical distance measurement device mounted with multiple light receiving elements converts each of detection signals detected by multiple light receiving elements from an analog signal into a digital signal, and thus it is necessary to mount as many analog-digital converters (hereinafter, referred to as "A/D converter") as the light receiving elements. Consequently, optical distance measurement devices have a disadvantage in that an increase in the number of portions, for which the distance is to be calculated, necessitates an increase in the number of A/D converters to be mounted, which disadvantageously results in higher costs.

The present invention has been made to solve the disadvantage as described above, and an object of the invention is to obtain an optical distance measurement device and a processing device capable of calculating distances to multiple portions in a measurement object without mounting multiple A/D converters.

Solution to Problem

An optical distance measurement device according to the present invention includes: a frequency sweep light outputting unit for repeatedly outputting frequency sweep light, a frequency of which changes with time in synchronization with a clock signal; an optical transmitter to output, as reference light, the frequency sweep light output from the frequency sweep light outputting unit and emit the frequency sweep light toward a measurement object; an optical interference unit to receive the frequency sweep light reflected on the measurement object as reflection light and outputting interference light of the reflection light and the reference light by causing interference between the reflection light and the reference light; a photodetector including multiple light receiving elements for receiving interference light output from the optical interference unit and outputting detection signals of the interference light; a control signal generator to generate a control signal indicating a detection signal to be selected in synchronization with the clock signal and output the control signal; a switch to select one of the detection signals output from the multiple light receiving elements in accordance with the control signal output by the control signal generator; and a distance calculator to calculate a distance to one portion of the measurement object on the basis of the detection signal selected by the switch.

Advantageous Effects of Invention

According to the present invention, an optical distance measurement device includes: a photodetector including multiple light receiving elements for receiving interference light output from an optical interference unit and outputting detection signals of the interference light; and a switch for selecting one of the detection signals output from the multiple light receiving elements, and a distance calculation unit calculates a distance to a portion of a measurement object on the basis of the detection signal selected by the switch. Therefore, the optical distance measurement device according to the present invention can calculate distances to multiple portions in a measurement object without mounting multiple A/D converters.

BRIEF DESCRIPTION OF DRAWINGS

FIG. 1A is a configuration diagram illustrating a processing device 2 according to a first embodiment. FIG. 1B is an explanatory diagram illustrating a measurement object 1.

FIG. 7 is an explanatory graph illustrating a frequency spectrum of interference light calculated by a Fourier transform unit 35a.

DESCRIPTION OF EMBODIMENTS

Figure 2:
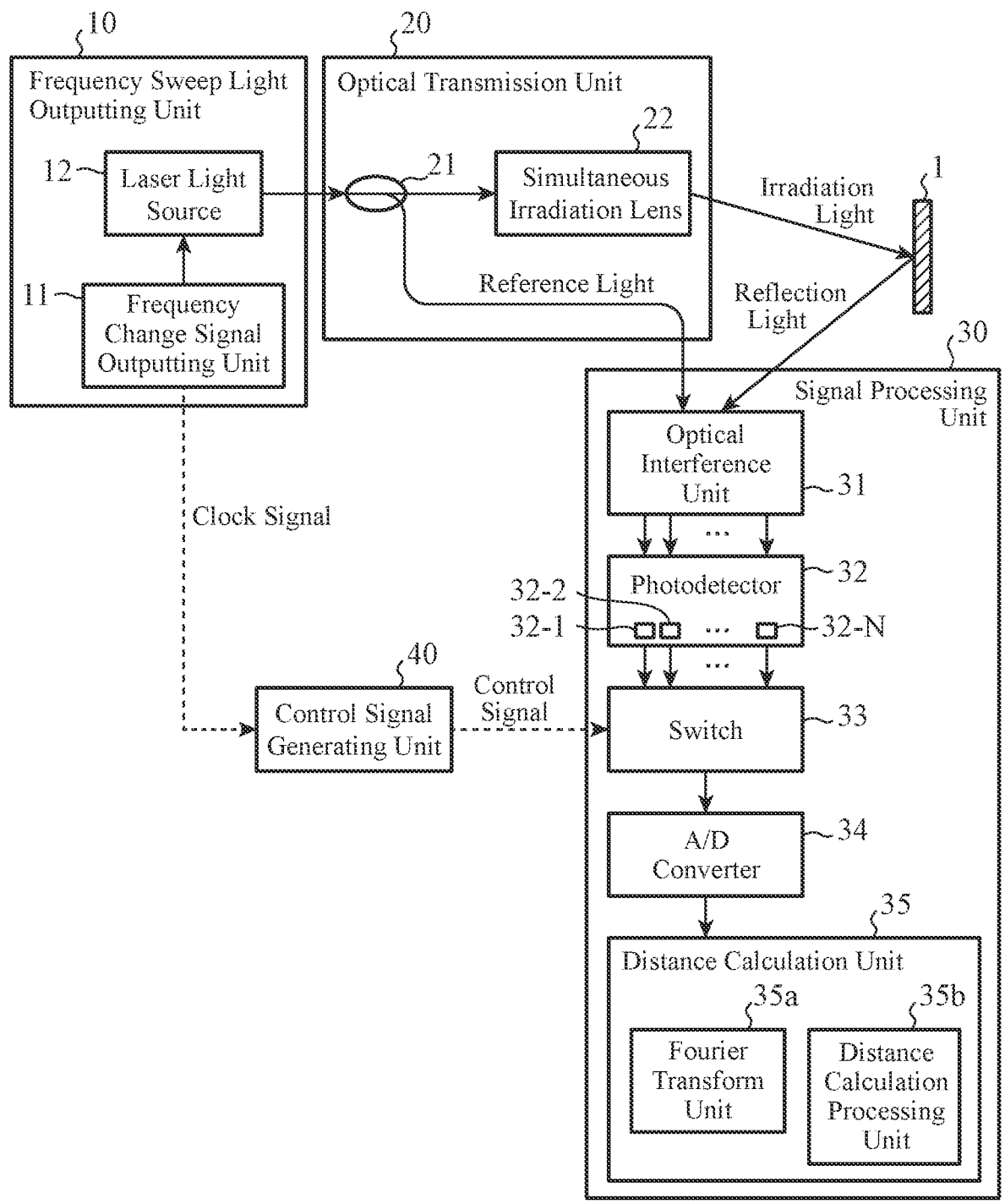
FIG. 2 is a configuration diagram illustrating an optical distance measurement device 3 according to the first embodiment.

In order to describe the present invention in further detail, embodiments for carrying out the invention will be described below with reference to the accompanying drawings.

First Embodiment

FIG. 1A is a configuration diagram illustrating a processing device 2 according to a first embodiment. FIG. 1B is an explanatory diagram illustrating a measurement object 1.

In FIG. 1, the measurement object 1 corresponds to a workpiece or the like to be processed by the processing device 2.

The processing device 2 includes an optical distance measurement device 3, a processing unit 4, and an inspection unit 5.

The optical distance measurement device 3 measures the distance to a surface portion of the measurement object 1 and outputs the measured distance to each of the processing unit 4 and the inspection unit 5. The surface portion of the measurement object 1 corresponds to, for example, portions 1-1 to 1-N as illustrated in FIG. 1B.

The processing unit 4 processes the measurement object 1 on the basis of the distance output from the optical distance measurement device 3.

Examples of processing of the processing unit 4 include processing of polishing the measurement object 1 or processing of cutting the measurement object 1 so that the distance output from the optical distance measurement device 3 matches the designed value.

The inspection unit 5 inspects the surface roughness of a surface portion or unevenness of a surface portion on the basis of the distance output from the optical distance measurement device 3.

Examples of inspection by the inspection unit 5 includes an inspection for determining whether or not the distance output from the optical distance measurement device 3 matches the design value.

FIG. 2 is a configuration diagram illustrating the optical distance measurement device 3 according to the first embodiment.

In FIG. 2, a frequency sweep light outputting unit 10 includes a frequency change signal outputting unit 11 and a laser light source 12.

The frequency sweep light outputting unit 10 repeatedly outputs frequency sweep light, the frequency of which changes with time, to an optical transmission unit 20.

The frequency change signal outputting unit 11 outputs a frequency change signal, the frequency of which changes with time, to the laser light source 12 in synchronization with a clock signal.

As the frequency change signal output from the frequency change signal outputting unit 11, a sine wave or the like is conceivable in addition to a triangular wave signal. In the optical distance measurement device 3 of the first embodiment, the frequency change signal outputting unit 11 outputs a triangular wave signal as the frequency change signal.

A triangular wave signal has a frequency that varies from the lowest frequency $f_{min}$ to the highest frequency $f_{max}$ with time.

When the frequency of the triangular wave signal reaches the highest frequency $f_{max}$, the frequency temporarily returns to the lowest frequency $f_{min}$, and then rises from the lowest frequency $f_{min}$ to the highest frequency $f_{max}$ again.

The laser light source 12 is connected with an optical coupler 21 of the optical transmission unit 20 via an optical fiber.

When the laser light source 12 receives the triangular wave signal from the frequency change signal outputting unit 11, the laser light source 12 outputs frequency sweep light, in which the change in frequency with time matches the change in frequency of the triangular wave signal, to the optical coupler 21.

The optical transmission unit 20 includes the optical coupler 21 and a simultaneous irradiation lens 22.

The optical transmission unit 20 outputs the frequency sweep light output from the frequency sweep light outputting unit 10 to a signal processing unit 30 as reference light.

The optical transmission unit 20 also emits the frequency sweep light output from the frequency sweep light outputting unit 10 toward the measurement object 1 as irradiation light.

The optical coupler 21 is connected with the simultaneous irradiation lens 22 via an optical fiber and is connected with an optical interference unit 31 of the signal processing unit 30 via an optical fiber.

The optical coupler 21 divides the frequency sweep light output from the frequency sweep light outputting unit 10 into two rays, and outputs one of the branched rays of frequency sweep light to the simultaneous irradiation lens 22 and the other one of the branched rays of frequency sweep light to the optical interference unit 31 as reference light.

The simultaneous irradiation lens 22 is implemented by a concave lens or the like.

The simultaneous irradiation lens 22 expands the beam diameter of the frequency sweep light output from the optical coupler 21, and emits the frequency sweep light having the expanded beam diameter into space toward the measurement object 1 as irradiation light.

The signal processing unit 30 includes the optical interference unit 31, a photodetector 32, the switch 33, an analog-digital converter (hereinafter referred to as "A/D converter") 34, and a distance calculation unit 35.

The optical interference unit 31 is connected with each of photo diodes (PDs) 32-1 to 32-N included in the photodetector 32 via optical fibers.

The optical interference unit 31 receives irradiation light reflected on each of the portions 1-1 to 1-N in the measurement object 1 as reflection light.

The optical interference unit 31 causes each ray of the received reflection light and the reference light output from the optical coupler 21 to interfere with each other, and outputs interference light of each ray of the reflection light and the reference light to the photodetector 32.

In the photodetector 32, N light receiving elements (hereinafter referred to as "PDs") 32-1 to 32-N are arranged two-dimensionally or one-dimensionally.

The PDs 32-1 to 32-N are arranged at positions corresponding to the portions 1-1 to 1-N of the measurement object 1, respectively.

The PDs 32-1 to 32-N detect each ray of the interference light output from the optical interference unit 31 and output a detection signal of each ray of the interference light to the switch 33.

The number of PDs arranged in the photodetector 32 may be freely selected. In a case where the number of portions of an object to which distance is to be measured is several hundreds to several thousands, then several hundreds to several thousands of PDs are arranged in the photodetector 32.

A control signal generating unit 40 generates a control signal indicating a detection signal to be selected from among the detection signals output from the PDs 32-1 to 32-N in synchronization with a clock signal, and outputs the control signal to the switch 33.

The switch 33 selects one of the detection signals output from the PDs 32-1 to 32-N in accordance with the control signal output from the control signal generating unit 40, and outputs the selected detection signal to the A/D converter 34.

The A/D converter 34 converts the detection signal output from the switch 33 from an analog signal into a digital signal (hereinafter, referred to as "digital detection signal"), and outputs the digital detection signal to the distance calculation unit 35.

The distance calculation unit 35 includes a Fourier transform unit 35a and a distance calculation processing unit 35b. The distance calculation unit 35 can be implemented by an arithmetic device such as a personal computer.

The distance calculation unit 35 performs processing of calculating the distance to a portion 1-$n$ ($n=1, 2, \ldots, N$) of the measurement object 1 on the basis of the digital detection signal output from the A/D converter 34.

The Fourier transform unit 35a performs processing of calculating a frequency spectrum of interference light by performing Fourier transform on the digital detection signal output from the A/D converter 34 and outputting the frequency spectrum to the distance calculation processing unit 35b.

The distance calculation processing unit 35b performs processing of calculating a difference between a frequency of a frequency component of the reflection light and a frequency of a frequency component of the reference light on the basis of the frequency spectrum output from the Fourier transform unit 35a.

In addition, the distance calculation processing unit 35b performs processing of calculating, from the calculated difference, a distance from the optical distance measurement device 3 to the portion 1-$n$.

Next, the operation of the optical distance measurement device 3 illustrated in FIG. 2 will be described.

The frequency sweep light outputting unit 10 repeatedly outputs frequency sweep light, the frequency of which changes with time, to the optical transmission unit 20.

Output operation of frequency sweep light by the frequency sweep light outputting unit 10 will be specifically described below.

The frequency change signal outputting unit 11 outputs a triangular wave signal, as a frequency change signal, the frequency of which changes with time, to the laser light source 12 in synchronization with a clock signal.

Figure 3:
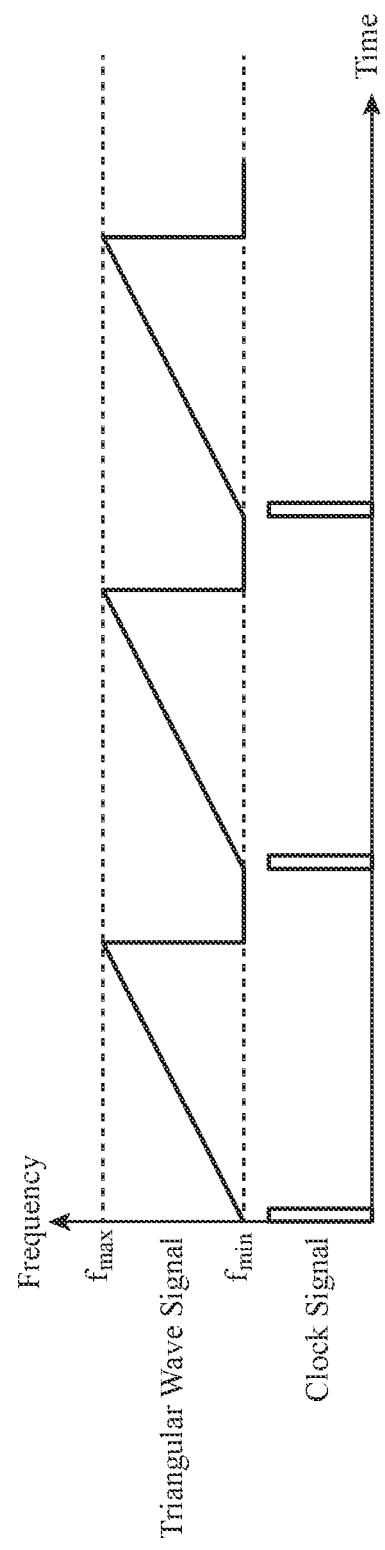
FIG. 3 is an explanatory graph illustrating a waveform of a triangular wave signal and a waveform of a clock signal.

FIG. 3 is an explanatory graph illustrating the waveform of the triangular wave signal and the waveform of the clock signal.

A triangular wave signal has a frequency that varies from the lowest frequency $f_{min}$ to the highest frequency $f_{max}$ with time.

When the frequency of the triangular wave signal reaches the highest frequency $f_{max}$, the frequency temporarily returns to the lowest frequency $f_{min}$, and then rises from the lowest frequency $f_{min}$ to the highest frequency $f_{max}$ again.

When the laser light source 12 receives the triangular wave signal from the frequency change signal outputting unit 11, the laser light source 12 outputs frequency sweep light, in which the change in frequency with time matches the change in frequency of the triangular wave signal, to the optical coupler 21.

Figure 4:
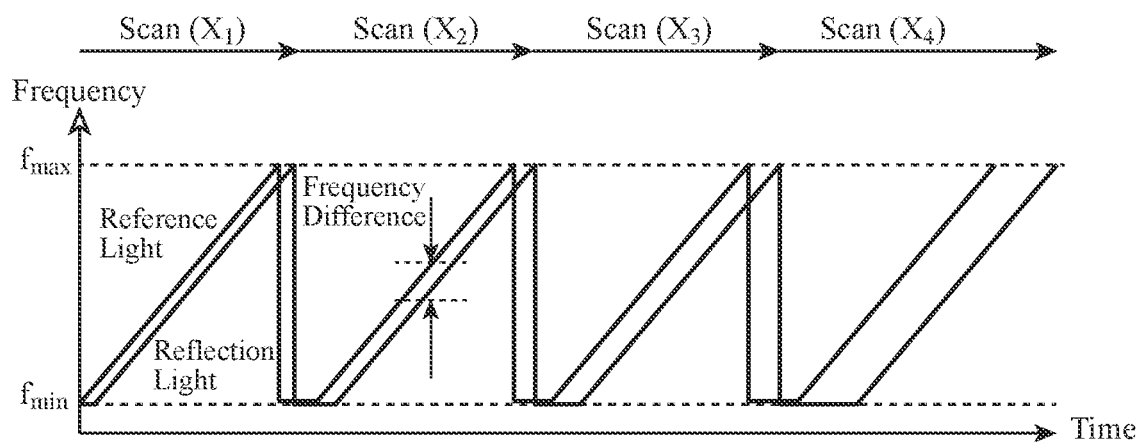
FIG. 4 is an explanatory graph illustrating reference light as frequency sweep light output from a laser light source 12, and reflection light reflected on portions 1-1 to 1-4 of the measurement object 1.

FIG. 4 is an explanatory graph illustrating reference light as frequency sweep light output from the laser light source 12, and reflection light reflected on the portions 1-1 to 1-4 of the measurement object 1.

Figure 5:
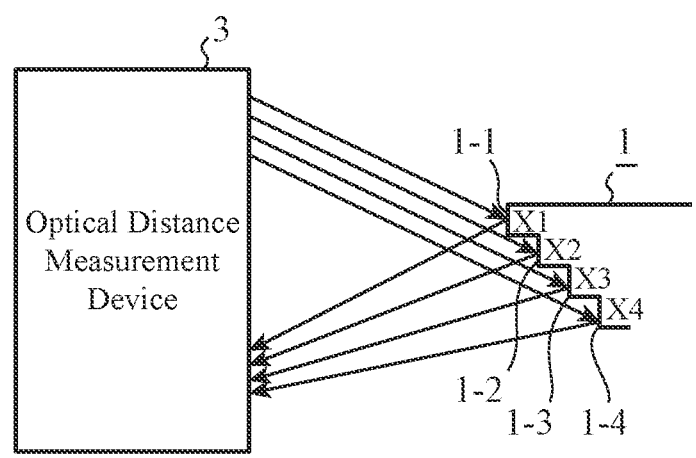
FIG. 5 is an explanatory diagram illustrating the portions 1-1 to 1-4 of the measurement object 1.

FIG. 5 is an explanatory diagram illustrating the portions 1-1 to 1-4 of the measurement object 1.

Like the triangular wave signal, when the frequency of the frequency sweep light reaches the highest frequency $f_{max}$, the frequency temporarily returns to the lowest frequency $f_{min}$, and then a frequency sweep is restarted.

Scan ($X_1$) indicates a time period in which reflection light reflected on the portion 1-1 of the measurement object 1 is scanned, and scan ($X_2$) indicates a time period in which reflection light reflected on the portion 1-2 of the measurement object 1 is scanned.

Scan ($X_3$) indicates a time period in which reflection light reflected on the portion 1-3 of the measurement object 1 is scanned, and scan ($X_4$) indicates a time period in which reflection light reflected on the portion 1-4 of the measurement object 1 is scanned.

The optical transmission unit 20 outputs the frequency sweep light output from the frequency sweep light outputting unit 10 to the signal processing unit 30 as reference light.

The optical transmission unit 20 also emits the frequency sweep light output from the frequency sweep light outputting unit 10 toward the measurement object 1 as irradiation light.

Hereinafter, the operation of irradiating irradiation light by the optical transmission unit 20 will be specifically described.

When the optical coupler 21 receives the frequency sweep light from the laser light source 12, the optical coupler 21 divides the frequency sweep light into two rays.

The optical coupler 21 outputs one of the branched rays of frequency sweep light to the simultaneous irradiation lens 22, and outputs the other one of branched rays of frequency sweep light to the optical interference unit 31 as reference light.

The simultaneous irradiation lens 22 expands the beam diameter of the frequency sweep light when receiving the frequency sweep light from the optical coupler 21, and emits the frequency sweep light having the expanded beam diameter into space toward the measurement object 1 as irradiation light.

When the simultaneous irradiation lens 22 emits the irradiation light into the space toward the measurement object 1, the optical interference unit 31 receives the irradiation light reflected on each of the portions 1-1 to 1-N of the measurement object 1 as reflection light. The light beam diameter of the irradiation light varies depending on the number of PDs included in the photodetector 32 and the resolution target value. For example in a case where the number of PDs included in the photodetector 32 is 4 and the resolution target value is 100 μm, the light beam diameter of the irradiation light is 400 μm.

As illustrated in FIG. 5, in a case where the portions 1-1 to 1-4 of the measurement object 1 are of concern, the optical interference unit 31 receives irradiation light reflected on each of the portions 1-1 to 1-4 as reflection light.

The optical interference unit 31 causes each ray of the received reflection light and the reference light output from the optical coupler 21 to interfere with each other, and outputs interference light of each ray of the reflection light and the reference light to the photodetector 32.

The PDs 32-1 to 32-N included in the photodetector 32 are arranged at positions corresponding to the portions 1-1 to 1-N in the measurement object 1, respectively.

The PDs 32-1 to 32-N detect each ray of the interference light output from the optical interference unit 31 and output a detection signal of each ray of the interference light to the switch 33.

As illustrated in FIG. 5, in a case where the portions 1-1 to 1-4 of the measurement object 1 are of concern, the PD32-1 detects interference light including reflection light reflected on the portion 1-1, and the PD32-2 detects interference light including reflection light reflected on the portion 1-2.

The PD 32-3 detects interference light including reflection light reflected on the portion 1-3, and the PD 32-4 detects interference light including reflection light reflected on the portion 1-4.

The control signal generating unit 40 generates a control signal indicating a detection signal to be selected from among the detection signals output from the PDs 32-1 to 32-N in synchronization with a clock signal, and outputs the control signal to the switch 33.

For example, a control signal generated in synchronization with a first clock signal indicates that the detection signal output from the PD 32-1 is to be selected.

A control signal generated in synchronization with a second clock signal indicates that the detection signal output from the PD 32-2 is to be selected.

A control signal generated in synchronization with an N-th clock signal indicates that the detection signal output from the PD 32-N is to be selected.

Since the photodetector 32 includes N PDs 32-1 to 32-N, the control signal generating unit 40 sequentially generates N control signals so that N detection signals are selected in order by the switch 33.

The switch 33 selects one of the detection signals output from the PDs 32-1 to 32-N in accordance with the control signal output from the control signal generating unit 40, and outputs the selected detection signal to the A/D converter 34.

Figure 6:
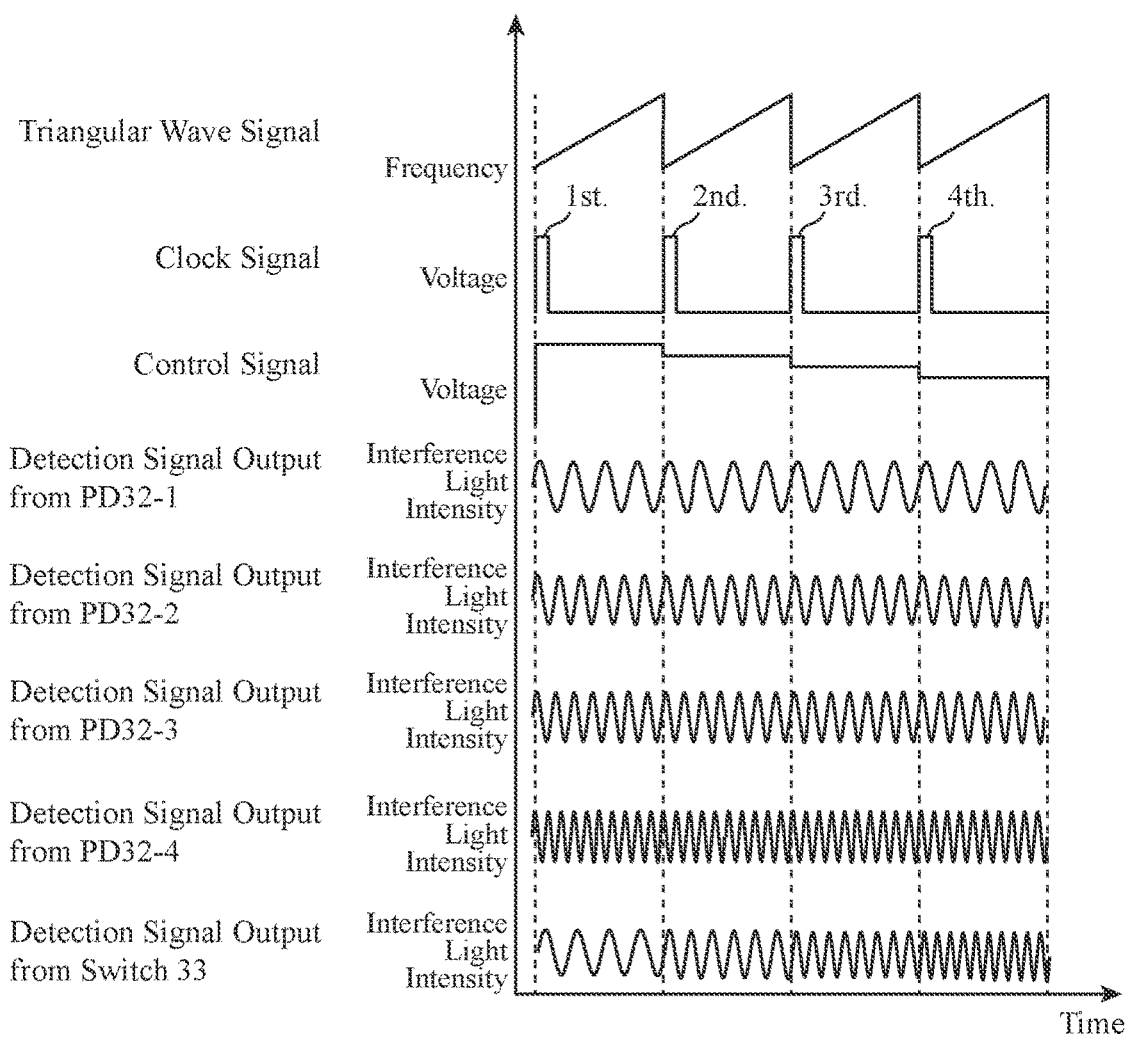
FIG. 6 is an explanatory graph illustrating a control signal output from a control signal generating unit 40, detection signals of interference light output from PDs 32-1 to 32-4, and a detection signal output from a switch 33.

FIG. 6 is an explanatory graph illustrating a control signal output from the control signal generating unit 40, detection signals of interference light output from the PDs 32-1 to 32-4, and a detection signal output from the switch 33.

In FIG. 6, for simplification of the drawing, the frequency sweep of the triangular wave signal is restarted immediately after the frequency of the triangular wave signal returns to the minimum frequency $f_{min}$, and it is not represented that the frequency of the triangular wave signal is maintained at the lowest frequency $f_{min}$ for a certain period of time.

A control signal output from the control signal generating unit 40 has a different voltage for each detection signal to be selected.

In FIG. 6, the control signal generating unit 40 outputs, to the switch 33, a control signal indicating that the detection signal output from the PD 32-1 is to be selected in synchronization with the first clock signal.

The control signal generating unit 40 outputs, to the switch 33, a control signal indicating that the detection signal output from the PD 32-2 is to be selected in synchronization with the second clock signal.

Likewise, the control signal generating unit 40 outputs, to the switch 33, a control signal indicating that the detection signal output from the PD 32-3 is to be selected in synchronization with a third clock signal.

Furthermore, the control signal generating unit 40 outputs, to the switch 33, a control signal indicating that the detection signal output from the PD 32-4 is to be selected in synchronization with a fourth clock signal.

In FIG. 6, the switch 33 outputs the detection signal output from the PD 32-1 to the A/D converter 34 in synchronization with the first clock signal, and then the switch 33 outputs the detection signal output from the PD 32-2 to the A/D converter 34 in synchronization with the second clock signal.

Furthermore, the switch 33 outputs the detection signal output from the PD 32-3 to the A/D converter 34 in synchronization with the third clock signal, and then the switch 33 outputs the detection signal output from the PD 32-4 to the A/D converter 34 in synchronization with the fourth clock signal.

Each time the A/D converter 34 receives a detection signal from the switch 33, the A/D converter 34 converts the detection signal from an analog signal to a digital signal and outputs the digital signal as a digital detection signal to the distance calculation unit 35.

Since the N PDs 32-1 to 32-N are included in the photodetector 32, the A/D converter 34 sequentially outputs N digital detection signals to the distance calculation unit 35.

When the Fourier transform unit 35a of the distance calculation unit 35 receives the digital detection signal from the A/D converter 34, the Fourier transform unit 35a calculates a frequency spectrum of interference light by performing Fourier transform on the digital detection signal, and outputs the frequency spectrum to the distance calculation processing unit 35b.

The Fourier transform unit 35a sequentially performs Fourier transform on the N digital detection signals since the N PDs 32-1 to 32-N are included in the photodetector 32.

Figure 7:
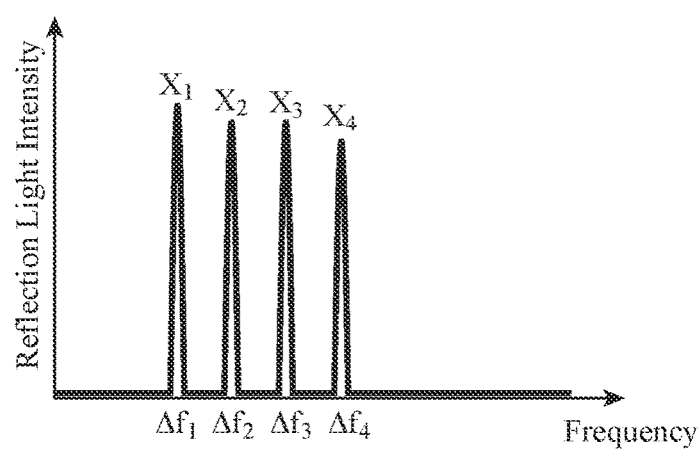

FIG. 7 is an explanatory graph illustrating a frequency spectrum of interference light calculated by the Fourier transform unit 35a.

Illustrated in FIG. 7 is a frequency spectrum in a case where the portions 1-1 to 1-4 of the measurement object 1 are of concern.

The time when reflection light arrives at the optical interference unit 31 is delayed from the time when reference light arrives at the optical interference unit 31, and thus a time difference occurs between the arrival time of the reflection light at the optical interference unit 31 and the arrival time of the reference light at the optical interference unit 31.

The frequency spectrum contains components of frequency differences $\Delta f_1$ to $\Delta f_4$ corresponding to the above time difference, and the frequency differences $\Delta f_1$ to $\Delta f_4$ are directly proportional to distances to the portions 1-1 to 1-4 of the measurement object 1, respectively. Each of the frequency differences $\Delta f_1$ to $\Delta f_4$ is a difference between each of the frequencies of reflection light reflected on the portions 1-1 to 1-4 and the frequency of the reference light, where $\Delta f_1 < \Delta f_2 < \Delta f_3 < \Delta f_4$ is satisfied.

When the distance calculation processing unit 35b receives the frequency spectrum from the Fourier transform unit 35a, the distance calculation processing unit 35b calculates frequency differences $\Delta f_n$ (n=1, 2, . . . , N) included in the frequency spectrum.

Since N PDs 32-1 to 32-N are included in the photodetector 32, the distance calculation processing unit 35b sequentially calculates N frequency differences $\Delta f_n$ included in the frequency spectrum.

Every time the distance calculation processing unit 35b calculates a frequency difference $\Delta f_n$, the distance calculation processing unit 35*b* calculates a distance $L_n$ from the optical distance measurement device 3 to a portion 1-*n* of the measurement object 1 from the frequency difference $\Delta f_n$.

Processing itself of calculating the distance $L_n$ from the frequency difference $\Delta f_n$ is known technology, and thus detailed description thereof will be omitted.

In the first embodiment described above, the optical distance measurement device 3 includes: the photodetector 32 including the PDs 32-1 to 32-N for receiving interference light output from the optical interference unit 31 and outputting detection signals of the interference light; and the switch 33 for selecting one of the detection signals output from the PDs 32-1 to 32-N, in which the distance calculation unit 35 calculates the distance to a portion of the measurement object 1 on the basis of the detection signal selected by the switch 33. Therefore, the optical distance measurement device 3 can calculate distances to multiple portions in the measurement object 1 without mounting multiple A/D converters.

Furthermore, in the optical distance measurement device 3 of the first embodiment, the optical interference unit 31 receives the frequency sweep light reflected on each of three or more portions 1-1 to 1-N in the measurement object 1 as reflection light and outputs interference light of each ray of the reflection light and the reference light by causing interference between each ray of the received reflection light and the reference light, and the PD 32-1 to 32-N are arranged at positions corresponding to three or more portions 1-1 to 1-N in the measurement object 1, respectively, and receive each ray of interference light output from the optical interference unit 31 and output a detection signal of each ray of interference light to the A/D converter 34. Therefore, the optical distance measurement device 3 can calculate distances to three or more portions 1-1 to 1-N in the measurement object 1.

In the optical distance measurement device 3 of the first embodiment, an example is illustrated in which the sweep characteristic of the frequency sweep light output from the laser light source 12 is linear.

However, it is not limited to the above example, and the sweep characteristic of the frequency sweep light output from the laser light source 12 may be non-linear.

In a case where the sweep characteristic of the frequency sweep light is non-linear, the frequency difference $\Delta L_n$ and the distance $L_n$ do not have a direct proportional relationship, and thus the distance calculation processing unit 35*b* compensates for the frequency difference $\Delta f_n$ and calculates the distance $L_n$ from the compensated frequency difference $\Delta f_n$.

Since the processing itself of compensating the frequency difference $\Delta f_n$ in a case where the sweep characteristic of the frequency sweep light is non-linear is known technology, detailed description is omitted.

Note that the switch 33 may have any configuration as long as the switch 33 selects one of the detection signals output from the PDs 32-1 to 32-N. For example, the configuration as illustrated in FIG. 8 is conceivable.

Figure 8:
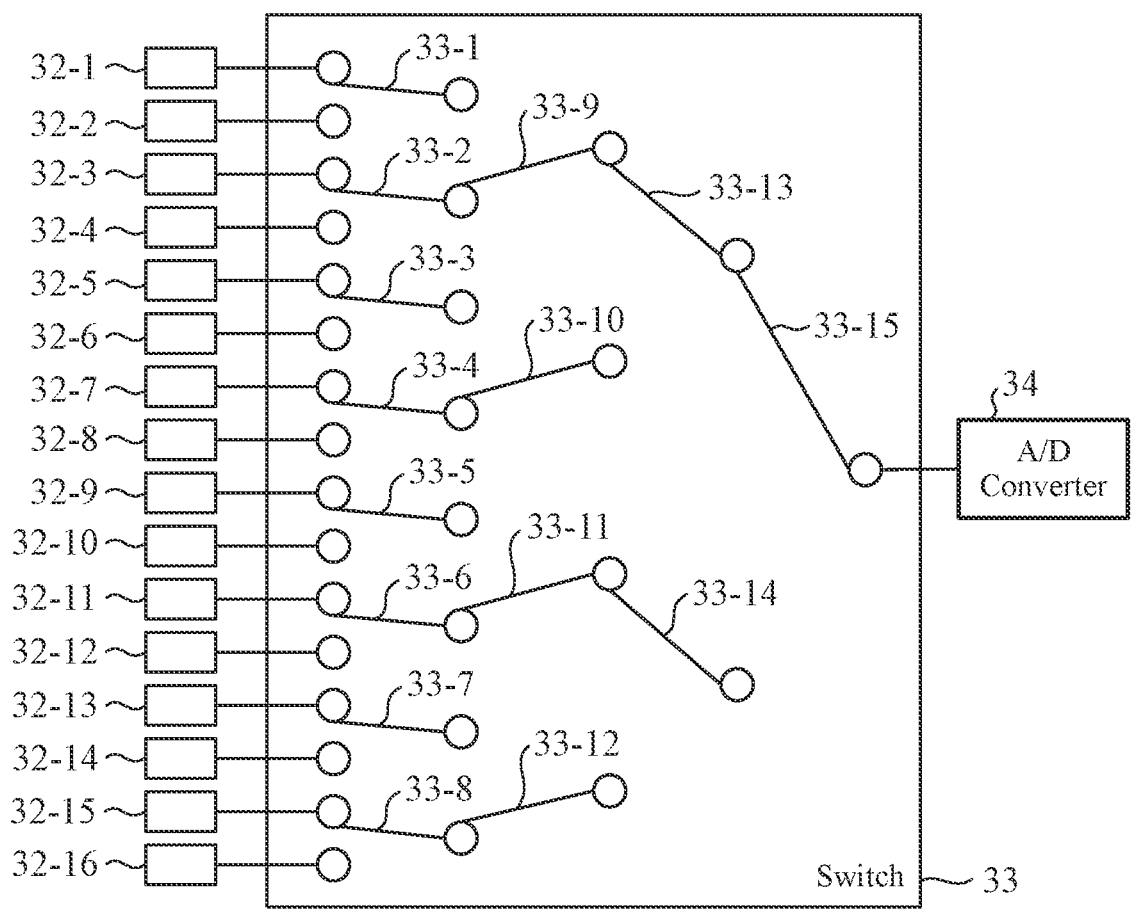
FIG. 8 is a configuration diagram illustrating an example of the switch 33 where N=16.

FIG. 8 is a configuration diagram illustrating an example of the switch 33 where N=16.

The switch 33 illustrated in FIG. 8 is a combination of switching elements 33-1 to 33-15.

Each of the switching elements 33-1 to 33-15 is a changeover switch for selecting one of two input signals.

In the example of FIG. 8, the switch 33 selects the detection signal output from the PD 32-3 from the detection signals output from the PDs 32-1 to 32-16.

Note that the present invention may include modifications of any component of the embodiments, or omission of any component of the embodiments within the scope of the present invention.

INDUSTRIAL APPLICABILITY

The present invention is suitable for an optical distance measurement device for calculating a distance to a measurement object.

The present invention is also suitable for a processing device including an optical distance measurement device.

REFERENCE SIGNS LIST

1: measurement object, 1-1 to 1-N: portion, 2: processing device, 3: optical distance measurement device, 4: processing unit, 5: inspection unit, 10: frequency sweep light outputting unit, 11: frequency change signal outputting unit, 12: laser light source, 20: optical transmission unit, 21: optical coupler, 22: simultaneous irradiation lens, 30: signal processing unit, 31: optical interference unit, 32: photodetector, 32-1 to 32-N: PD, 33: switch, 33-1 to 33-15: switching element, 34: A/D converter, 35: distance calculation unit, 35*a*: Fourier transform unit, 35*b*: distance calculation processing unit, 40: control signal generating unit

The invention claimed is:

1. An optical distance measurement device comprising:
a frequency sweep light outputting unit to output repeatedly frequency sweep light, a frequency of which changes with time in synchronization with a clock signal;
an optical transmitter to output, as reference light, the frequency sweep light output from the frequency sweep light outputting unit and emit the frequency sweep light toward a measurement object;
an optical interference unit to receive the frequency sweep light reflected on the measurement object as reflection light and output interference light of the reflection light and the reference light by causing interference between the reflection light and the reference light;
a photodetector including multiple light receiving elements for receiving interference light output from the optical interference unit and outputting detection signals of the interference light;
a control signal generator to generate a control signal indicating a detection signal to be selected in synchronization with the clock signal and outputting the control signal;
a switch to select one of the detection signals output from the multiple light receiving elements in accordance with the control signal output by the control signal generator; and
a distance calculator to calculate a distance to one portion of the measurement object on a basis of the detection signal selected by the switch.

2. An optical distance measurement device comprising:
a frequency sweep light outputting unit to repeatedly output frequency sweep light, a frequency of which changes with time in synchronization with a clock signal, the frequency sweep light outputting unit including: a frequency change signal outputting unit to output a frequency change signal, a frequency of which changes with time, in synchronization with the clock signal; and a laser light source to receive the frequency change signal from the frequency change signal outputting unit and output the frequency sweep light that matches with changes in the frequency of the frequency change signal;

an optical transmitter to output, as reference light, the frequency sweep light output from the frequency sweep light outputting unit and emit the frequency sweep light toward a measurement object;

an optical interference unit to receive the frequency sweep light reflected on the measurement object as reflection light and output interference light of the reflection light and the reference light by causing interference between the reflection light and the reference light;

a photodetector including multiple light receiving elements for receiving interference light output from the optical interference unit and outputting detection signals of the interference light;

a switch to select one of the detection signals output from the multiple light receiving elements;

a distance calculator to calculate a distance to one portion of the measurement object on a basis of the detection signal selected by the switch; and a control signal generator to generate a control signal indicating a detection signal to be selected in synchronization with the clock signal and output the control signal, wherein the switch selects one detection signal in accordance with the control signal output by the control signal generator.

3. The optical distance measurement device according to claim 1, wherein the optical interference unit receives the frequency sweep light reflected on each of three or more portions of the measurement object as reflection light, and outputs interference light of each ray of the reflection light and the reference light by causing interference between each ray of the received reflection light and the reference light, and the multiple light receiving elements are arranged at positions corresponding to each of the three or more portions of the measurement object, receive each ray of the interference light output from the optical interference unit, and output a detection signal of each ray of the interference light to the switch.

4. The optical distance measurement device according to claim 2, wherein the optical interference unit receives the frequency sweep light reflected on each of three or more portions of the measurement object as reflection light, and outputs interference light of each ray of the reflection light and the reference light by causing interference between each ray of the received reflection light and the reference light, and the multiple light receiving elements are arranged at positions corresponding to each of the three or more portions of the measurement object, receive each ray of the interference light output from the optical interference unit, and output a detection signal of each ray of the interference light to the switch.

5. The optical distance measurement device according to claim 1, further comprising an analog-digital converter to convert the detection signal selected by the switch from an analog signal to a digital signal and output the digital signal to the distance calculator.

6. The optical distance measurement device according to claim 2, further comprising an analog-digital converter to convert the detection signal selected by the switch from an analog signal to a digital signal and output the digital signal to the distance calculator.

7. The optical distance measurement device according to claim 3, further comprising an analog-digital converter to convert the detection signal selected by the switch from an analog signal to a digital signal and output the digital signal to the distance calculator.

8. The optical distance measurement device according to claim 1, wherein the switch comprises a combination of multiple switching elements.

9. The optical distance measurement device according to claim 2, wherein the switch comprises a combination of multiple switching elements.

10. The optical distance measurement device according to claim 3, wherein the switch comprises a combination of multiple switching elements.

11. The optical distance measurement device according to claim 4, wherein the switch comprises a combination of multiple switching elements.

12. A processing device comprising: an optical distance measurement device for measuring a distance to a measurement object; and a processing unit to process the measurement object on a basis of the distance measured by the optical distance measurement device, wherein the optical distance measurement device includes:

a frequency sweep light outputting unit to repeatedly output frequency sweep light, a frequency of which changes with time in synchronization with a clock signal;

an optical transmitter to output, as reference light, the frequency sweep light output from the frequency sweep light outputting unit and emit the frequency sweep light toward a measurement object;

an optical interference unit to receive the frequency sweep light reflected on the measurement object as reflection light and output interference light of the reflection light and the reference light by causing interference between the reflection light and the reference light;

a photodetector including multiple light receiving elements for receiving interference light output from the optical interference unit and outputting detection signals of the interference light;

a control signal generator to generate a control signal indicating a detection signal to be selected in synchronization with the clock signal and output the control signal;

a switch to select one of the detection signals output from the multiple light receiving elements in accordance with the control signal output by the control signal generator; and a distance calculator to calculate a distance to one portion of the measurement object on a basis of the detection signal selected by the switch.

13. A processing device comprising:

an optical distance measurement device to measure a distance to a measurement object; and a processing unit to process the measurement object on a basis of the distance measured by the optical distance measurement device, wherein the optical distance measurement device includes:

a frequency sweep light outputting unit to repeatedly output frequency sweep light, a frequency of which changes with time in synchronization with a clock signal, the frequency sweep light outputting unit including: a frequency change signal outputting unit for outputting a frequency change signal, a frequency of which changes with time, in synchronization with the clock signal; and a laser light source for receiving the frequency change signal from the frequency change signal outputting unit and output the frequency sweep light that matches with changes in the frequency of the frequency change signal;

an optical transmission unit to output, as reference light, the frequency sweep light output from the frequency sweep light outputting unit and emit the frequency sweep light toward a measurement object;

an optical interference unit to receive the frequency sweep light reflected on the measurement object as reflection light and output interference light of the reflection light and the reference light by causing interference between the reflection light and the reference light;

a photodetector including multiple light receiving elements for receiving interference light output from the optical interference unit and outputting detection signals of the interference light;

a switch to select one of the detection signals output from the multiple light receiving elements;

a distance calculator to calculate a distance to one portion of the measurement object on a basis of the detection signal selected by the switch; and a control signal generator to generate a control signal indicating a detection signal to be selected in synchronization with the clock signal and output the control signal, wherein the switch selects one detection signal in accordance with the control signal output by the control signal generator.

14. The processing device according to claim 12, further comprising an inspection unit to inspect the measurement object on a basis of the distance measured by the optical distance measurement device.

15. The processing device according to claim 13, further comprising an inspection unit to inspect the measurement object on a basis of the distance measured by the optical distance measurement device.

* * * * *